United States Patent [19]

Cornell

[11] 4,328,535

[45] May 4, 1982

[54] SAFETY DEVICE FOR A TROUBLE LIGHT

[76] Inventor: James W. Cornell, P.O. Box 155, Altamonte Springs, Fla. 32701

[21] Appl. No.: 140,783

[22] Filed: Apr. 16, 1980

[51] Int. Cl.[3] .............................................. B60Q 3/04

[52] U.S. Cl. .................................... 362/362; 362/294; 362/378; 362/396

[58] Field of Search ............... 362/294, 376, 362, 378, 362/396

[56] References Cited

U.S. PATENT DOCUMENTS 3,108,752 10/1963 Duprey ............................... 362/294

4,086,482 4/1978 Torgerson ........................... 362/376

*Primary Examiner*—Stephen J. Lechert, Jr.

*Attorney, Agent, or Firm*—Victor J. Evans & Co.

[57] ABSTRACT

A safety device for a trouble light having a metal cup-shaped housing provided with a socket for a light bulb disposed within the interior of the housing with a wire guard on the housing for protectively surrounding the exposed light bulb comprising a pad of heat resistant material conforming substantially to the shape of the housing, the pad being detachably mounted on the outer surface of the housing so as to protect burning of the skin of an individual who may inadvertently contact the housing in a heated condition.

7 Claims, 4 Drawing Figures

FIG. 1
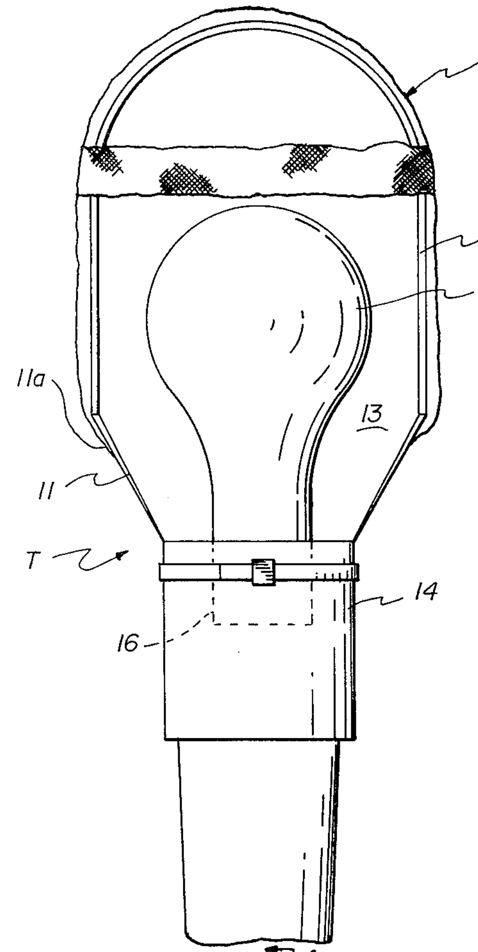
FIG 2
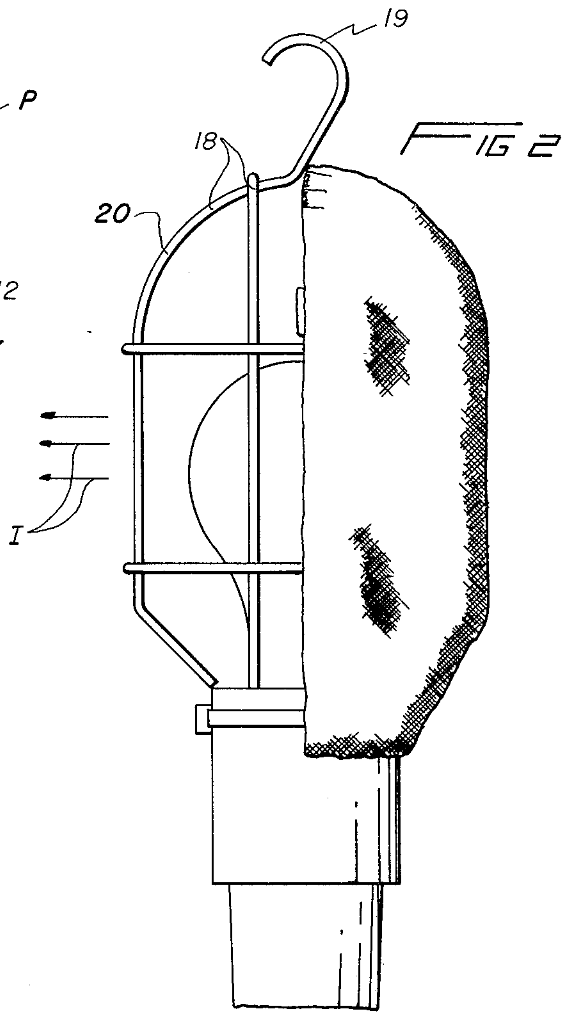
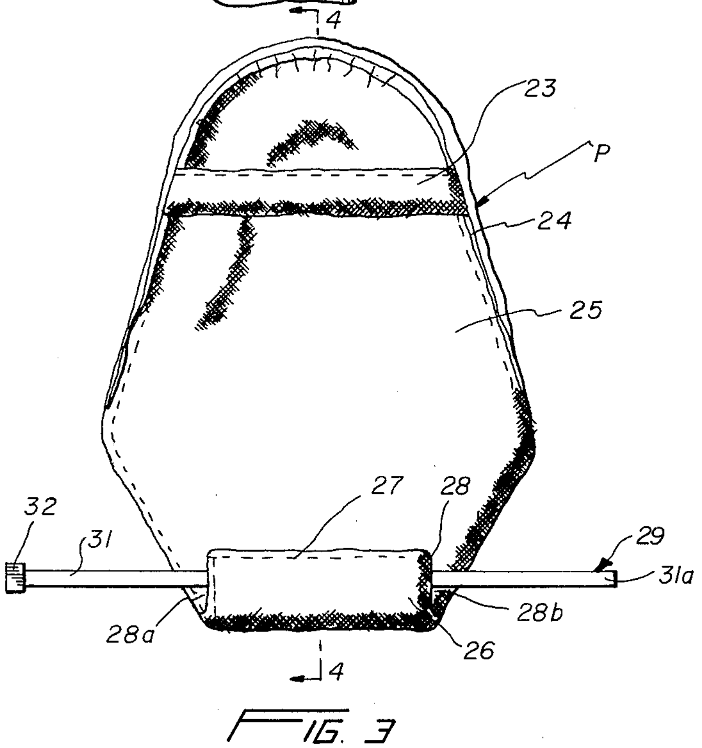
FIG. 3
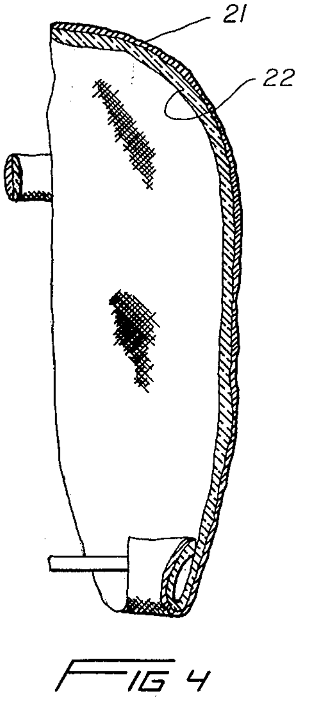
FIG 4

SAFETY DEVICE FOR A TROUBLE LIGHT

BACKGROUND OF THE INVENTION

A common device in use today by service personnel such as automobile mechanics, electricans and the like is a trouble light. Such trouble lights are utilized by a workman to illuminate the area of work such as an automobile body, electrical machinery, etc. where inadequate lighting conditions require localized illumination for performing repair work and the like. Such trouble lights are all of generally the basic construction which includes a cup-shaped reflector housing having a base portion containing a socket for a light bulb extending within the interior of the housing and enclosed on the side opposite the housing by a wire guard to prevent damage to the bulb during use yet permitting illumination through the guard from the bulb. The wire guard is generally provided with a hooked portion for hanging the trouble light from an adjacent support and the light is arranged to be connected to an associated source of electric power by a power cord.

The light bulb utilized in such trouble lights is usually of a size to provide considerable illumination and may be 75 to 100 watts or even higher in wattage. Obviously, light bulbs of such power develop considerable heat during use and, as such a bulb is disposed in closely spaced relationship with the housing, the temperature of the housing is raised to a relatively high level such that contact of the housing by the skin of an individual can produce quite a painful burn. Since such trouble lights are generally located close to the workmen in a work area, inadvertent contact with the trouble light housing is not uncommon particularly when the attention of the workmen is diverted by concentration on the work being performed.

SUMMARY AND OBJECTS OF THE INVENTION

Accordingly, a primary object of this invention is to provide a new and novel safety device for a trouble light which prevents injury to personnel resulting from contact of the skin with the housing of the trouble light.

Another object of this invention is to provide a new and novel insulating cover for the housing of a trouble light which prevents direct contact by a workman with the heated housing during use.

A further object of this invention is to provide a new and novel safety device for a trouble light which is simple and inexpensive in construction, which may be easily mounted on or removed from the trouble light housing and which does not interfere with the illumination provided by the trouble light.

The objects of the invention and other related objects are accomplished by the provision of a pad of heat resistant sheet material having a shape corresponding generally to the shape of the cup-shaped reflector housing of the light. The light housing is provided with a base portion in which a lamp socket is mounted for accommodating a light bulb extending at least partially within the interior of the housing. The housing is provided with a marginal edge defining an opening over which a wire guard may be positioned for protecting the bulb against damage and the pad is provided with means for detachably mounting the pad on the outer surface of the housing which includes a strap secured at opposite ends to the upper portion of the pad so as to extend over the marginal edge of the housing and the lower portion of the pad is provided with a tie for detachably securing the bottom portion of the pad to the base portion of the housing.

Other objects and advantages of the invention will become apparent when viewed in the light of the following specification taken in conjunction with the accompanying drawing.

BRIEF DESCRIPTION OF THE DRAWINGS

FIG. 1 is a front elevation view of a trouble light with the guard removed together with the safety device of the invention;

FIG. 2 is a side elevation view of the trouble light of FIG. 1;

FIG. 3 is a plan view as viewed from the inside of the safety device; and

FIG. 4 is a sectional view taken substantially along line 4—4 of FIG. 3 in the direction of the arrows.

DESCRIPTION OF THE PREFERRED EMBODIMENT

Referring now to the drawing and to FIG. 1 in particular, there is shown a trouble light designated generally by the letter T of conventional construction in association with a safety device of the invention shown best in FIGS. 3, and 4 and designated generally by the letter P.

The trouble light T includes a cup-shaped reflector housing 11 of metal or the like having a marginal edge 12 and an interior 13. The trouble light T includes a base portion 14 suitably attached to the housing 11 in which is disposed in the conventional manner a socket 16 for accommodating a light bulb such as an incandescent light bulb 17 disposed at least partially in the housing interior 13. The socket 16 is arranged to be connected by conductors or the like to an associated source of electric power.

As is well known, the trouble light T includes a wire guard 20 which is arranged to be detachably mounted on the opening defined by the marginal edge 12 of the housing 11 so as to protect the bulb 17 from damage while permitting the illumination from the bulb 17 to be directed outwardly from the reflector housing 11 as indicated by the arrows I. Preferably, as is well known, the wire guard 20 which is formed from wires 18 is provided with a hook 19 for hanging the light T from a suitable support adjacent the work area to be illuminated. As is well known, when the trouble light T is in use, the heat developed from the bulb 17 is transferred to the metal housing 11 and inadvertent contact with the housing in the heated condition however brief can cause a rather painful burn to an individual. Accordingly, as specifically illustrative of the invention and shown best in FIGS. 3 and 4, a pad designated generally by the letter P is provided which is formed of heat resistant sheet material and is shaped so as to correspond generally to the outer surface 11*a* of the housing 11. In the illustrated embodiment, the pad P is of multi-layered construction having an outer layer 21 of textile material which in the preferred embodiment may be a blend of cotton and polyester and an inner layer 22 also of textile material preferably a blend of cotton and rayon. In the illustrated embodiment, the inner layer 22 has a greater thickness than the outer layer 21 as shown best in FIG. 4.

Means are provided for mounting the pad P on the outer surface 11*a* of the housing 11 so that the housing outer surface 11*a* is completely covered by the pad P. In the illustrated embodiment, such mounting means preferably permit the pad P to be detachably mounted on the housing 11, as shown best in FIG. 3, such mounting means include a strap 23, preferably formed of heat resistant material similar to the pad P and secured by sewing or the like to the edge 24 of the pad P adjacent the upper end of the pad. Thus, when the pad P is mounted on the housing 11 as shown in FIG. 2, with the wire guard 20 removed or opened the strap 23 extends across the opening in the housing 11 in retaining engagement with the housing marginal edge 12.

The mounting means for the pad P also preferably includes a folded over portion 26 on the lower end of the pad 26 suitably attached to the body of the pad by means such as stitching 27 so as to extend transversely across the lower end of the pad body 25 to define a sleeve 28 having open ends 28*a*, 28*b*. A tie 29 is included with the pad P which may be of the type commonly utilized by electricans or the like including a strip 31 of plastic material having a collar 32 formed intergrally therewith for accommodating the end portion 31*a* of the strip 31. As is well known, the collar 32 and strip portion 31*a* are provided with suitable notches (not shown) for retaining the strip 31 in a longitudinally adjusted position within the collar 32.

The tie 29 is inserted through the sleeve 28 so to extend outwardly at either end and when the pad P is mounted on the housing 11 in the manner shown in FIG. 2 the tie 29 is tightened around the base portion 14 of the trouble light T drawing the lower end portion of the pad body 25 tightly around the base portion 14 to retain, together with the strap 23 the pad body 25 in the mounted position on the trouble light T. Thus, the outer surface 11*a* of the trouble light housing 11 is covered by the pad P and when the housing 11 is heated during use the pad P protects against inadvertenet contact by the skin of an individual with the heating housing 11 due to the heat resistant material of which the pad body 25 is composed.

I claim:

1. A safety device for a trouble light of the type including a reflector housing of cup-shaped configuration having an interior and a marginal edge defining an opening for access to said housing interior, a base portion on said housing, a socket in said base portion arranged to be connected to an associated source of electric power, said socket being adapted to accommodate a light bulb with said bulb disposed at least partially in said housing interior and a guard mounted on said housing in enclosing relationship with said opening for protecting said bulb from damage comprising, a flexible pad of heat resistant sheet material having a shape corresponding generally to the shape of said housing and means for mounting said pad on said housing in overlying relationship with the outer surface of said housing to prevent inadvertant body contact and burning with said housing which is in a heated condition during use.

2. A safety device in accordance with claim 1 wherein said mounting means comprise means on said pad for detachably mounting said pad on said housing.

3. A safety device in accordance with claim 2 wherein said pad mounting means include a strap secured at opposite ends to the marginal edges of said pad adjacent the upper portion of said pad for retaining engagement with the marginal edge of said housing in the mounted position of said pad on said housing.

4. A safety device in accordance with claim 3 wherein said pad mounting means include a tie attached to the lower portion of said pad for retaining engagement with said housing base portion in the mounted position of said pad on said housing.

5. A safety device in accordance with claim 4 including a folded-over portion on the lower end of said pad forming a sleeve having open ends, said sleeve being arranged to accommodate said tie with the end portions of said tie extending outwardly from the ends of said sleeve for interconnection around said housing base portion in the mounted position of said pad on said housing.

6. A safety device in accordance with claim 5 wherein said pad is of multi-layered construction including an outer layer of textile material and an inner layer of textile material of greater thickness than the thickness of said outer layer.

7. A safety device in accordance with claim 6 wherein said outer layer comprises a blend of cotton and polyester and wherein said inner layer comprises a blend of cotton and rayon.

* * * * *